(12) United States Patent
Bazin et al.

(10) Patent No.: US 11,100,617 B2
(45) Date of Patent: Aug. 24, 2021

(54) DEEP LEARNING METHOD AND APPARATUS FOR AUTOMATIC UPRIGHT RECTIFICATION OF VIRTUAL REALITY CONTENT

(71) Applicant: Korea Advanced Institute of Science and Technology, Daejeon (KR)

(72) Inventors: Jean-Charles Bazin, Daejeon (KR); Rae Hyuk Jung, Daejeon (KR); Seung Joon Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/599,590

(22) Filed: Oct. 11, 2019

(65) Prior Publication Data
US 2020/0118255 A1   Apr. 16, 2020

(30) Foreign Application Priority Data

Oct. 12, 2018 (KR) .................. 10-2018-0121714
Feb. 12, 2019 (KR) .................. 10-2019-0015940

(51) Int. Cl.
| | | |
|---|---|---|
| *G06T 5/00* | (2006.01) | |
| *G06N 3/08* | (2006.01) | |
| *G06N 3/04* | (2006.01) | |
| *G06T 3/60* | (2006.01) | |
| *G06N 3/00* | (2006.01) | |

(52) U.S. Cl.
CPC ............ *G06T 5/006* (2013.01); *G06N 3/006* (2013.01); *G06N 3/04* (2013.01); *G06N 3/08* (2013.01); *G06T 3/60* (2013.01); *G06T 2207/20081* (2013.01); *G06T 2207/20084* (2013.01)

(58) Field of Classification Search
CPC .. G06T 5/006; G06T 3/04; G06T 3/08; G06T 3/60
See application file for complete search history.

(56) References Cited

U.S. PATENT DOCUMENTS

| | | | |
|---|---|---|---|
| 2019/0080467 A1* | 3/2019 | Hirzer | ...................... G06T 7/74 |
| 2019/0244407 A1* | 8/2019 | Wiesel | ................... G06T 11/60 |

FOREIGN PATENT DOCUMENTS

KR        10-1697713 B1      1/2017

OTHER PUBLICATIONS

Hong, E., et al., "Deep Learning based Photo Horizon Correction", Journal of the Korea Computer Graphics Society, (Jul. 2017), vol. 23, No. 3, pp. 95-103, 10 pages.
Su, Y, et al., "Learning Spherical Convolution for Fast Features from 360° Imagery", The University of Texas at Austin, (2017), 11 pages.
Jung, J, et al., "Robust upright adjustment of 360 spherical panoramas", Springer-Verlag Berlin Heidelberg, (2017), vol. 33 pp. 737-747,11 pages.

* cited by examiner

*Primary Examiner* — Matthew Salvucci
(74) *Attorney, Agent, or Firm* — Hunton Andrews Kurth LLP

(57) ABSTRACT

Proposed are a deep learning method and apparatus for the automatic upright rectification of VR content. The deep learning method for the automatic upright rectification of VR content according to an embodiment may include inputting a VR image, to a neural network and outputting orientation information of the VR image through a trained neural network.

3 Claims, 9 Drawing Sheets

DEEP LEARNING METHOD AND APPARATUS FOR AUTOMATIC UPRIGHT RECTIFICATION OF VIRTUAL REALITY CONTENT

CROSS REFERENCE TO RELATED APPLICATION

This application is based on and claims priority under 35 U.S.C. 119 to Korean Patent Application No. 10-2018-0121714, filed on Oct. 12, 2018 and Korean Patent Application No. 10-2019-0015940, filed on Feb. 12, 2019, in the Korean Intellectual Property Office, the disclosures of which is herein incorporated by reference in their entireties.

BACKGROUND OF THE INVENTION

1. Technical Field

The following embodiments relate to the upright rectification of a Virtual Reality (VR) image, and more particularly, to a deep learning method and apparatus for the automatic upright rectification of VR content. In this document, we use the term "VR" contents since they are advertised for VR applications and meant to be displayed on a VR headset. Depending on the context, such contents are also called spherical, 360 or omnidirectional contents. The task is to automatically rectify the orientation of an input VR image, that is to estimate the orientation of the image and return a rectified upright version of the input VR image in such a way that it looks as if it was captured by a vertically straight VR camera. This task is commonly called rectification or upright adjustment. In this document, we equivalently write rectification, upright adjustment and upright rectification. In this document, we equivalently write straight, vertical, and upright to refer to the (opposite) gravity direction.

2. Description of the Related Art

Over the last few years, numerous spherical VR cameras have appeared in the market. With just one button click, they can capture high-quality full spherical VR images, i.e., with a horizontal field of view (FOV) of 360 degrees and a vertical FOV of 180 degrees. Therefore they greatly democratized and simplified the acquisition of real-world VR contents. These VR contents are being used in various contexts and applications, such as entertainment industry, virtual tourism, cultural heritage, real estate advertisement, among many others. The captured VR images can then be displayed on any screen in the traditional equirectangular (also called panoramic) format, and also on a VR headset in stereoscopic views, where the user can look at any viewing directions by turning the head, just like in real life.

However, in practice, when the VR camera is not vertically straight, the captured VR image is mis-oriented, which often occurs with hand-held VR cameras. Therefore it appears non-straight, and contains a wavy horizon and slanted contents. As a consequence, when such image is displayed on a VR headset, it also looks tilted, which reduces the quality of the VR experience and leads to visual discomfort.

Korean Patent No. 10-1697713 relates to such a virtual content generation method and describes a technology for generating intelligent panorama VR content.

SUMMARY OF THE INVENTION

Embodiments describe a deep learning method and apparatus for the automatic upright rectification of VR content, and more particularly, provide a deep learning-based approach for the automatic upright rectification of VR content.

Embodiments provide a deep learning method and apparatus for the automatic upright rectification of VR content, which estimate orientation information indicative of the orientation of a VR image from an input VR image using a deep learning neural network.

VR image covers a horizontal field of view of 360 degrees and a vertical field of view of 180 degrees. In this document, we equivalently use the terms spherical, 360, 360-degrees or omnidirectional to refer to such VR images or contents.

When a VR image is mapped onto a sphere, the horizon corresponds to a great circle, that is the intersection between the sphere and a plane passing through the sphere center. The vector normal to this great circle corresponds to the orientation of the horizon plane, that is the orientation of the camera and the image. This orientation can be represented by a vector and in this document, we call it the up-vector. When the camera is upright, its orientation is vertical and so the up-vector is (0,0,1). Reciprocally, when the camera is not straight, the captured VR image is misoriented and the associated up-vector is $v=(v\_x,v\_y,v\_z) \neq (0,0,1)$.

A deep learning method for the automatic upright rectification of VR content according to an embodiment may include inputting a VR image to a neural network and outputting the up-vector of the VR image through a trained deep learning neural network.

The method may further include upright-rectifying the VR image by applying a rotation that maps the output up-vector to the straight vector (0,0,1) to the VR image, which in turn provides the upright rectified version of the input image In this case, inputting the VR image, to the deep learning neural network may include inputting the VR image to a convolutional neural network (CNN).

The orientation information may have been parameterized as at least one of a unit vector, rotation angles, azimuth+ elevation angles, and a quaternion. Orientation information may be parametrized by other parametrizations.

The method may further include automatically generating a dataset of VR images composed of numerous VR images having ground truth orientations in order to train the deep learning neural network.

Automatically generating the dataset of VR images may include automatically downloading numerous VR images from the Internet or other sources, assuming the VR images to be an upright state, and generating new VR images by synthesizing versions having various orientations.

The method may further include training the deep learning neural network using the generated dataset of VR images.

A deep learning apparatus for the automatic upright rectification of VR content according to an embodiment may include a neural network unit configured with a convolutional neural network estimating an up-vector of an input VR image from the VR image.

The apparatus may further include a data generation unit automatically generating a dataset of VR images composed of numerous VR images having ground truth orientations in order to train the neural network.

In this case, the neural network unit may receive a VR image and output orientation information (up-vector) of the VR image through a trained deep learning neural network.

The deep learning apparatus may further include an image rectification unit that returns an upright-rectified version of the input VR image by applying a rotation that maps the output estimated up-vector to the straight direction (0,0,1) to the input VR image.

The neural network may be a convolutional neural network (CNN).

The data generation unit may automatically download multiple VR images from the Internet or other sources, may assume the VR images to be an upright state, and may generate new VR images by synthetically rotating the original VR images with various orientations.

The neural network unit may train the neural network using the generated dataset of VR images.

Furthermore, a deep learning apparatus for automatic upright rectification of VR content according to an embodiment may include a neural network unit configured with a neural network, an input unit inputting a VR image to the neural network, and an output unit outputting the orientation information (up-vector) of the VR image through the trained deep learning neural network.

The deep learning apparatus may further include a data generation unit automatically generating a dataset of VR images composed of numerous VR images having ground truth orientations in order to train the neural network.

DETAILED DESCRIPTION

Figure 1A:
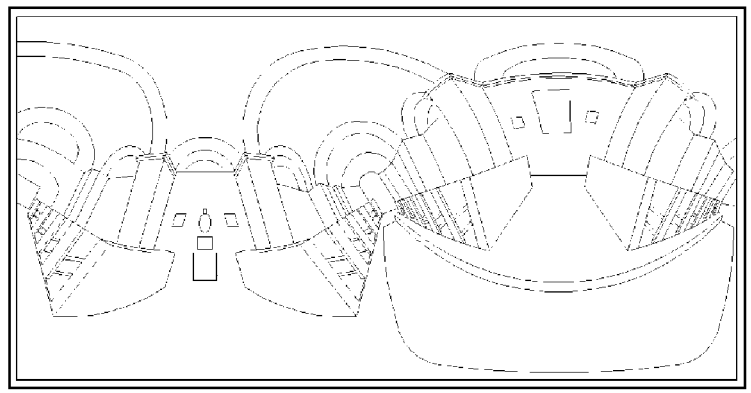
FIGS. 1a and 1b are diagrams for illustrating the upright rectification of a VR image according to an embodiment.

Hereinafter, embodiments are described with reference to the accompanying drawings. However, the described embodiments may be modified in various other forms, and the scope of the present invention is not restricted by the following embodiments. Furthermore, several embodiments are provided to fully describe the present invention to a person having ordinary knowledge in the art. The shapes, sizes, etc. of elements in the drawings may be exaggerated for a clear description.

Figure 1B:
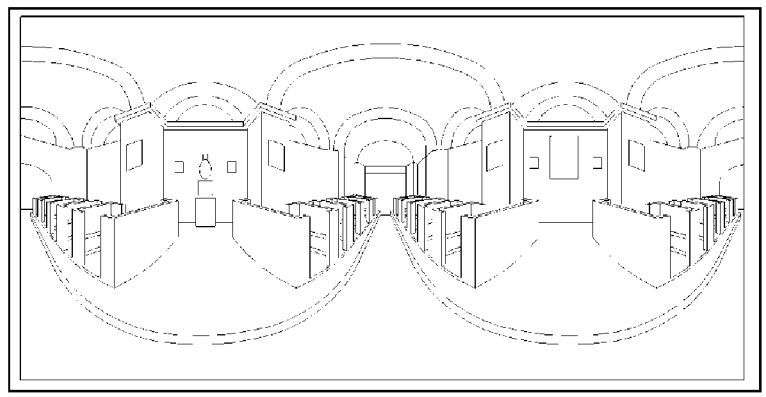

FIGS. 1a and 1b are diagrams for illustrating the upright rectification of a VR image according to an embodiment.

FIG. 1a shows an input VR image (i.e., VR content) that may not be vertically straight. FIG. 1b shows the upright rectification output of a VR image automatically obtained by a method according to embodiments.

Embodiments of the present invention are intended to solve a problem called the upright adjustment (or upright rectification) of a VR image. As shown in FIG. 1(b), a rectified version of an input VR image is generated as if the VR camera was vertically straight. Hereinafter, a VR image may be used as a meaning including an image and video.

Various technologies have been proposed for the upright rectification of a VR image. However, the existing technologies have important limits.

For example, a user may manually rectify an image using dedicated software capable of interactively adjusting image orientations. However, to repeat such rectification for several images is an inconvenient, manual and time-consuming process. In contrast, the proposed method according to embodiments fully operates automatically.

For another example, the camera may be set vertically as much as possible upon capturing, such as that a tripod and a bull's eye level are used in order to adjust the pitch and roll of the camera. However, this cannot be applied to various use cases, such as a hand-held camera, or a case where the camera is installed on a rotating platform (e.g., drone). In contrast, the proposed method according to embodiments can be applied as post-processing and thus can operate when it is applied to a hand-held camera and robot/mobile platforms (vehicle, drone, robot, etc.).

For yet another example, gyroscope data can be used. However, VR cameras having gyroscopes embedded therein are a small minority. Some of the VR cameras are limited to only 1-axis (e.g., the pitch of Samsung Gear 360) and require additional hardware, resulting in a additional cost. Accordingly, the VR cameras cannot be applied to an "in the wild" image (i.e., image without metadata from the internet). In contrast, the proposed method according to embodiments can overcome all of such limits.

Other technologies may automatically rectify an image by analyzing the line and vanishing point of the image. However, these technologies can be applied to only an image obtained in an environment including lines, that is, an urban environment. In contrast, embodiments propose a technology capable of operating in general scenes, such as countryside, forest and mountain scenes, in addition to urban environments.

As described above, the existing technologies require the manual rectification of an image. This is inconvenient and time-consuming. The existing other technologies may automatically adjust an image by analyzing the line and vanishing point of the image, but can be applied to only man-made urban environments.

In contrast, embodiments propose a new deep learning-based method designed to automatically process various environments including urban scenes and non-urban scenes, such as countryside, forest and mountain scenes. In this case, the deep learning-based approach method means a neural network (NN), for example, a convolutional neural network (CNN).

Such embodiments correspond to the first deep learning-based approach method for the automatic upright rectification of VR content of general scenes.

Input to a neural network is a VR image (or video) as shown in FIG. 1a.

Furthermore, output of the neural network is the "orientation" of the VR image. The orientation may be parameterized in various manners, such as a unit vector, rotation angles, an azimuth+elevation, and a quaternion. The proposed method according to embodiments is not limited to such parameterization.

When the up-vector of a VR image is given, the VR image may be rectified by applying the rotation matrix that maps the up-vector to the straight orientation (0,0,1) to the input image. For example, as shown in FIG. 1b, the upright version of the VR image may be automatically obtained.

Such a proposed method according to embodiments may be applied to various applications.

Figure 2A:
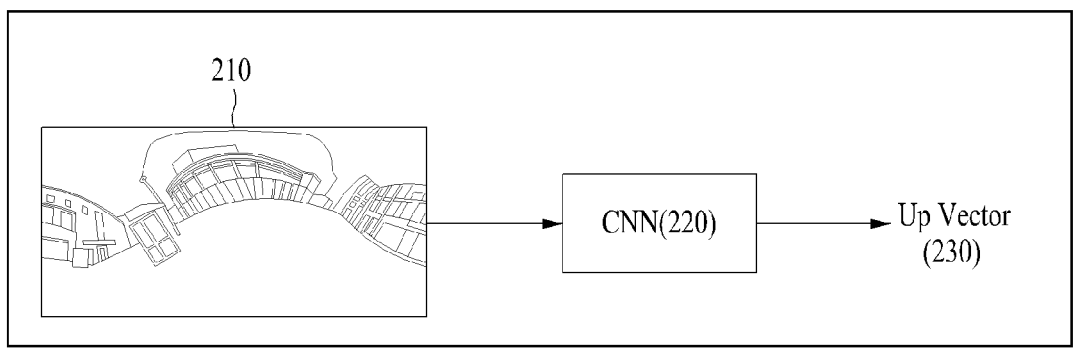
FIGS. 2a and 2b are diagrams showing a workflow of the automatic upright rectification of a VR image according to an embodiment.
Figure 2B:
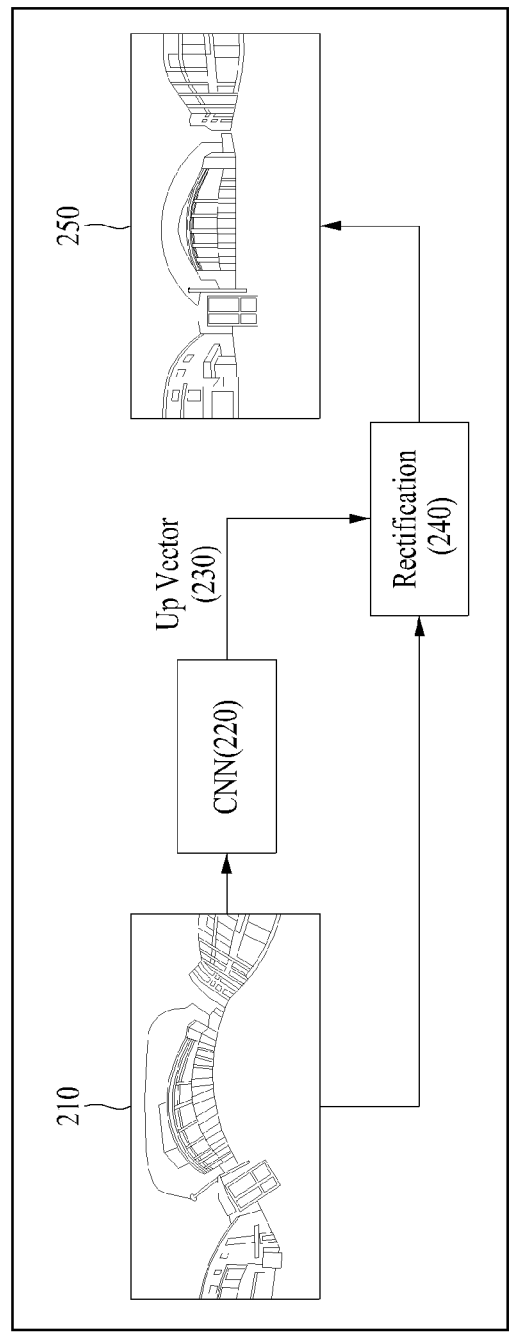

FIGS. 2a and 2b are diagrams showing a workflow of the automatic upright rectification of a VR image according to an embodiment.

For example, automatic upright rectification may be applied to a VR image and video. First, as shown in FIG. 2a, orientation information (up-vector) 230, may be output by inputting a VR image 210 to a convolution neural network (CNN) 220. In this case, the orientation information 230 may be parameterized in various manners, such as a unit vector, rotation angles, an azimuth+elevation, and a quaternion.

Furthermore, as shown in FIG. 2b, an upright-rectified VR image 250 may be obtained by rectifying (240) the input, potentially misoriented, VR image 210 using the orientation information 230 output through the convolution neural network (CNN) 220.

Figure 3:
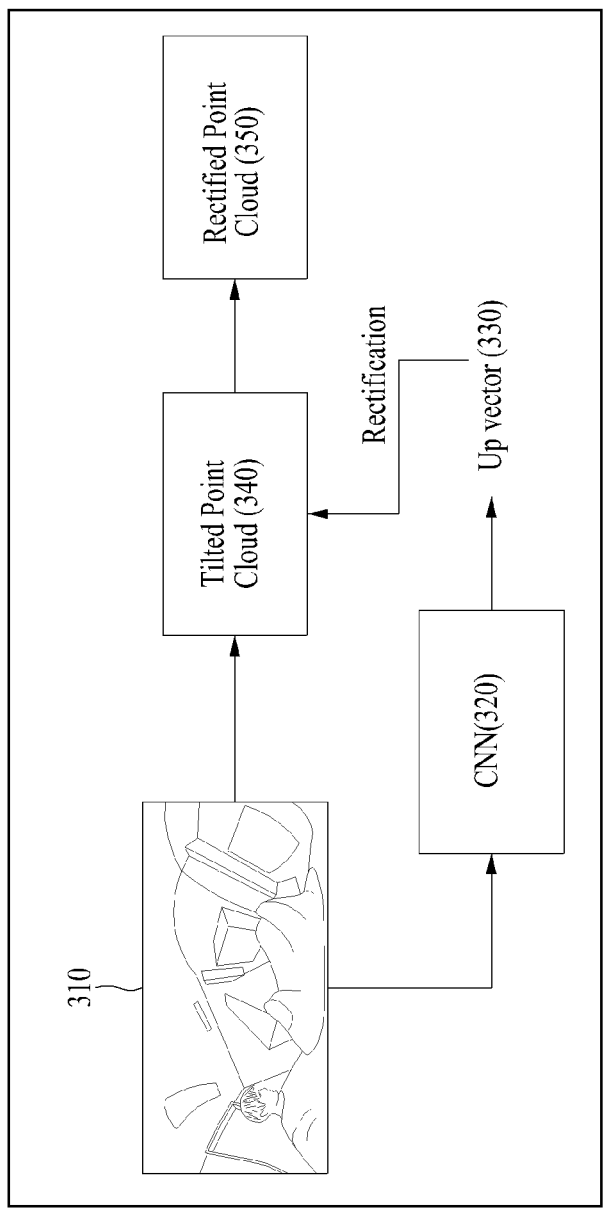
FIG. 3 is a diagram showing a workflow of the upright rectification of a 3D point cloud reconstructed from VR images by applying up-vector information obtained according to this embodiment.

FIG. 3 is a diagram showing a workflow of the upright rectification of a 3D point cloud which is reconstructed from VR images according to an embodiment.

As shown in FIG. 3, for another example, automatic upright rectification may be applied to a 3D point cloud which is reconstructed from VR images.

Orientation information (up-vector) 330, such as an azimuth and elevation that correspond to the up-vector may be output by inputting a VR image 310 to a convolution neural network (CNN) 320. Thereafter, a rectified 3D point cloud 350 may be obtained by rectifying a tilted point cloud 340 using the output orientation information 330.

The proposed method according to embodiments may be configured with two major modules.

The first module may automatically generate a large-scale VR image dataset composed of numerous VR images having ground truth orientations in order to train a neural network (NN). Furthermore, the second module may be configured with a neural network (NN) that is trained by generated data and estimates orientation information (up-vector) from an input VR image. In this case, the input may be a VR image, and the output may be the orientation information (up-vector) of the image. The first module and the second module are described more specifically below.

The first module may generate data. In this case, the first module may generate data by synthetically rotating original VR images. For example, numerous VR images with ground truth are necessary to train the convolution neural network (CNN). However, to manually obtain numerous training images (by manually capturing actual VR images in various orientations) is inconvenient and extremely time-consuming in practice. Accordingly, embodiments may provide an algorithm for automatically generating a large-scale VR image dataset with corresponding ground truth orientations.

The second module may train the neural network using the above-described dataset, that is, the large-scale VR image dataset generated by the first module. A proposed method according to embodiments may be based on various convolution neural network (CNN) architectures, loss functions and orientation parameterizations.

Specifically, the first module may generate a VR image dataset automatically.

Such a first module may automatically generate a large-scale VR image dataset configured with numerous VR images having ground truth orientations in order to train the neural network. For example, a large-scale collection of straight VR panorama images which may be available on the Internet may be used. In embodiments, numerous VR images have been automatically downloaded on the Internet. The VR images are assumed to be straight, which are valid in most of verified VR images. Thereafter, various versions having different orientations may be synthetically generated with respect to each of the VR images. Such a first module may be described more specifically through FIG. 4.

Figure 4:
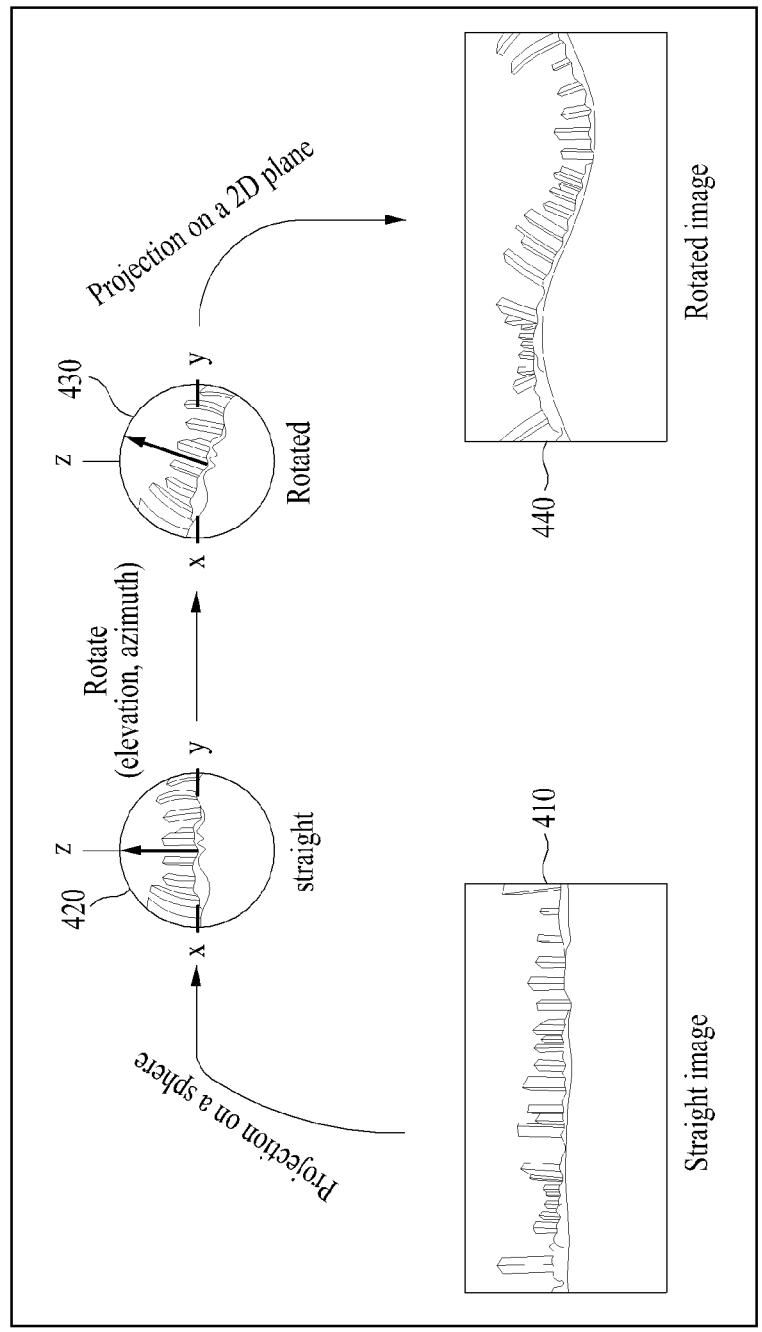
FIG. 4 is a diagram for illustrating the automatic generation of a rotated VR image having ground truth orientations according to an embodiment.

FIG. 4 is a diagram for illustrating the automatic generation of a rotated VR image having ground truth orientations according to an embodiment.

As shown in FIG. 4, in embodiments, after a anoramic image 420 projected onto a sphere is obtained by projecting a straight image 410, that is, a (straight-line) panorama image, onto the sphere, a rotated spherical image 430 may be obtained by artificially rotating the spherical image in random orientations. Thereafter, a rotated image 440 may be obtained by projecting the rotated spherical image 430 back onto a 2D plane again. The rotated image 440 may provide ground truth orientations in addition to the rotated image itself. Accordingly, the rotated image 440 having ground truth orientations in addition to the rotated VR image itself may be automatically generated from the straight image 410.

Finally, embodiments obtain a large-scale collection of VR images having various orientations. The orientations have already been known (because they have been synthetically rotated). Thereafter, the large-scale data collection may be used to train a neural network according to embodiments.

The second module may be configured with a neural network.

As described in FIGS. 2a, 2b and 3, the second module may be configured with a deep learning-based neural network (NN), and may be configured with a convolutional neural network (CNN), for example. In this case, input to the DNN of the second module is a VR image, and output thereof is orientation information. The NN may be trained by a large-scale dataset generated by the first module.

A deep neural network approach method according to embodiments may be based on various convolution neural network (CNN) architectures, loss functions and orientation parameterizations.

In experiments according to embodiments, a convolution neural network (CNN) constructed based on an InceptionV3 convolution neural network (CNN) structure was used. Specific architectures of the convolution neural network (CNN) used in this patent may be substituted with other architectures.

An approach method according to embodiments may use various types of loss functions in order to train the deep neural network. That is, the approach method is not limited to a specific choice for a cost function. For example, the cost function may be L1, L2, log-cosh, Huber loss, etc.

Output of the neural network is the "orientation" of an input image. The orientation may be parameterized in various manners, such as a unit vector, rotation angles, azimuth+elevation angles, and a quaternion. An approach method according to embodiments is not limited to a specific parameterization.

Each module is described more specifically below by taking one example. Hereinafter, a data generation unit may be the first module or may include the first module. A neural network unit may be the second module or may include the second module.

Figure 5:
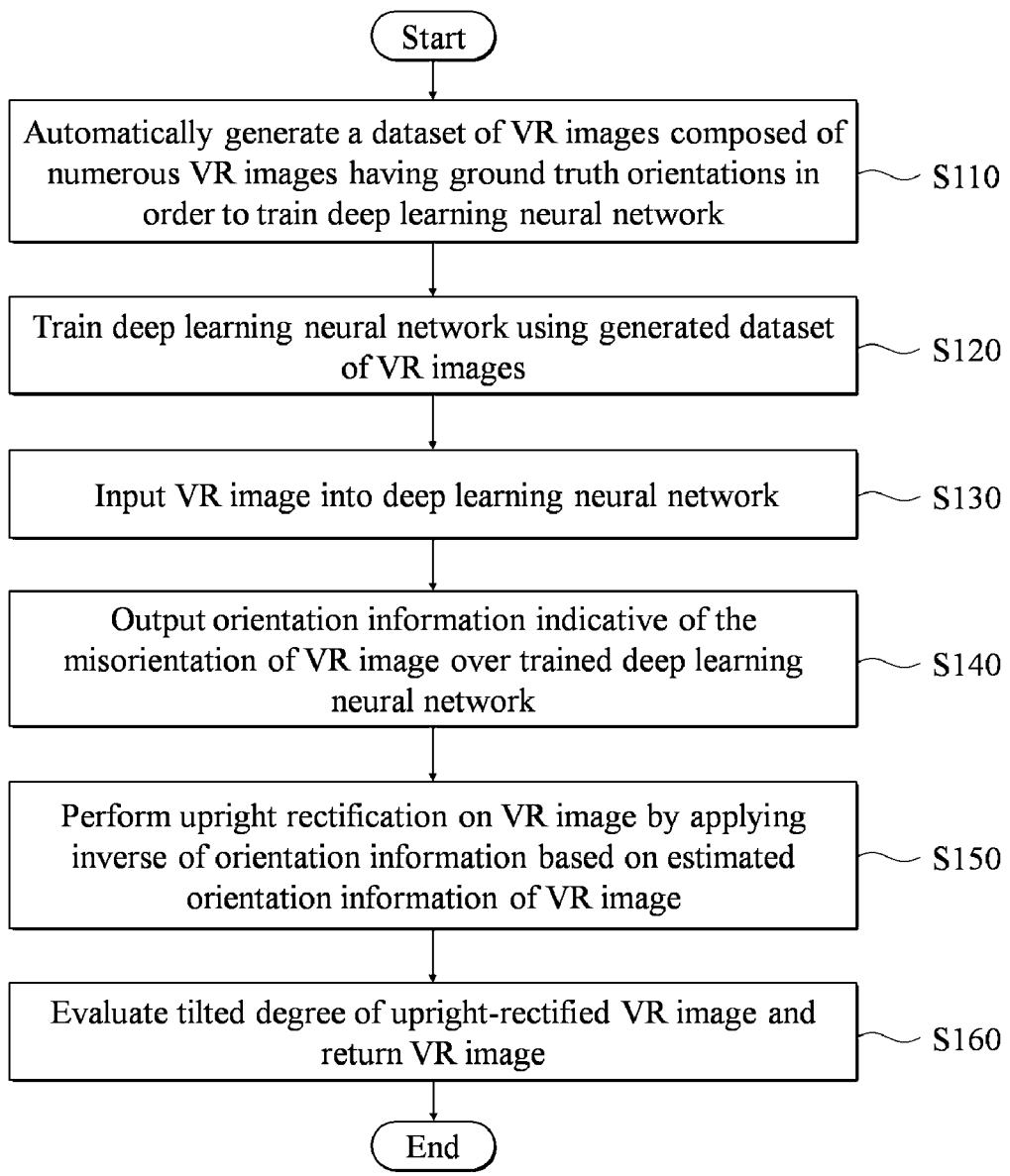
FIG. 5 is a flowchart showing a deep learning method for the automatic upright rectification of VR content according to an embodiment.

FIG. 5 is a flowchart showing a deep learning method for the automatic upright rectification of VR content according to an embodiment.

Referring to FIG. 5, the deep learning method for the automatic upright rectification of VR content according to an embodiment may include step S130 of inputting a VR image, to a deep learning neural network and step S140 of outputting up-vector of the VR image through a trained deep learning neural network. Furthermore, the method may further include step S150 of performing upright rectification on the VR image by applying the rotation matrix that maps the up-vector to (0,0,1) to the VR image.

Furthermore, the deep learning method may further include step S110 of automatically generating a dataset of VR images composed of numerous VR images having ground truth orientations in order to train a neural network and step S120 of training the neural network using the generated dataset of the VR images.

In embodiments, the up-vector of a VR image may be estimated from an input VR image using a neural network.

The elements of the deep learning method for the automatic upright rectification of VR content according to an embodiment are described more specifically below.

The deep learning method for the automatic upright rectification of VR content according to an embodiment may be described more specifically using a deep learning apparatus for the automatic upright rectification of VR content according to an embodiment.

Figure 6:
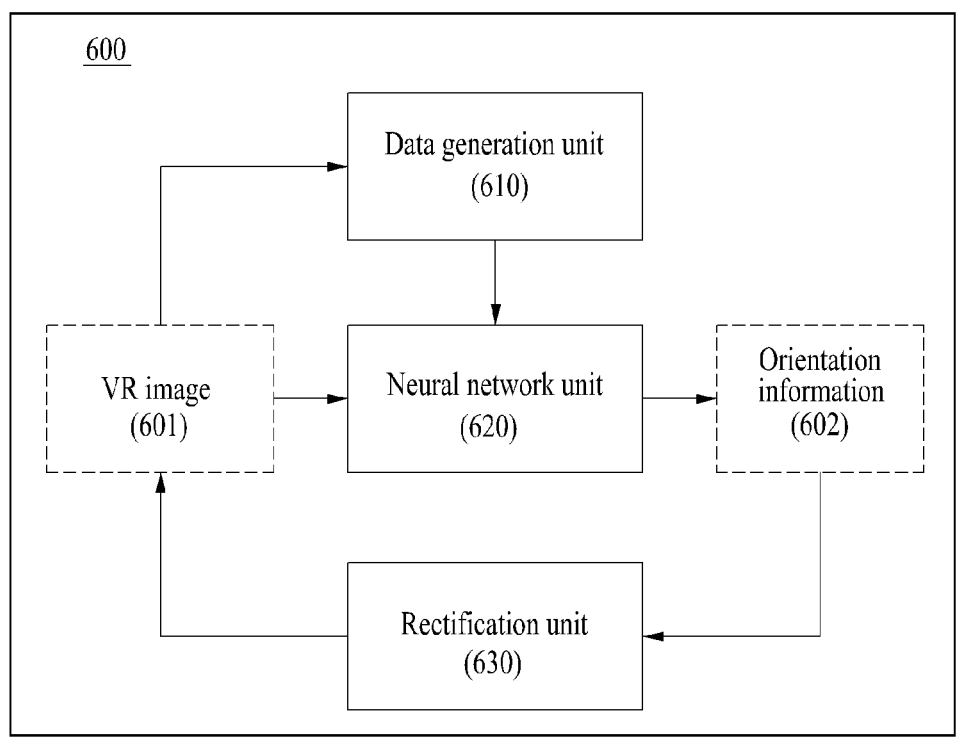
FIG. 6 is a block diagram showing a deep learning apparatus for the automatic upright rectification of VR content according to an embodiment.

FIG. 6 is a block diagram showing a deep learning apparatus for the automatic upright rectification of VR content according to an embodiment.

Referring to FIG. 6, the deep learning apparatus 600 for the automatic upright rectification of VR content according to an embodiment includes a neural network unit 620, and may further include a data generation unit 610 and a rectification unit 630. Meanwhile, the rectification unit 630 may be included in the neural network unit 620. Furthermore, the deep learning apparatus 600 for the automatic upright rectification of VR content may further include an evaluator. Moreover, in some embodiments, the deep learning apparatus 600 for the automatic upright rectification of VR content may further include an input unit and an output unit, which are described below.

At step S110, the data generation unit 610 may automatically generate a dataset of VR images 601 composed of numerous VR images 601 having ground truth orientations in order to train a neural network.

More specifically, the data generation unit 610 may automatically download multiple VR images from the Internet in order to automatically generate the dataset of VR images 601. Furthermore, the data generation unit 610 assumes the downloaded VR images 601 to be an upright state, and may generate a new VR image by synthetically rotating the original VR images to have different orientations with respect to each of the VR images 601.

At step S120, the neural network unit 620 may train the neural network using the generated dataset of the VR images 601

At step S130, the neural network unit 620 may input the VR image 601, to a trained deep learning neural network. In this case, the neural network may be a convolution neural network (CNN). Accordingly, the VR image 601 captured by the VR camera may input to the convolution neural network (CNN). A separate input unit may be configured for the input of the VR image 601.

At step S140, the neural network unit 620 may output orientation information 602 of the VR image through the trained neural network. A separate output unit may be configured for the output of the orientation information 602 of the VR image 601.

In this case, the orientation information 602 of the VR image 601 may mean an up-vector. Furthermore, the orientation information 602 may be parameterized as at least one of a unit vector, rotation angles, an azimuth+elevation, and a quaternion.

At step S150, the rectification unit 630 may upright-rectify the VR image 601 by applying the rotation matrix that maps the output up-vector to (0,0,1) 602 based on the orientation information (up-vector) 602 of the VR image 601 estimated by the network. Meanwhile, the rectification unit 630 may be included in the neural network unit 620. In this case, the rectification unit 630 of the neural network unit 620 may upright-rectify the VR image 601 by applying the inverse of the orientation information 602 based on the measured orientation information 602 of the VR image 601.

Furthermore, at step S160, the evaluator may evaluate a tilted degree of the upright-rectified VR image based on the orientation information (up-vector) output through the deep learning neural network, and may return a VR image having a small tilted degree.

In this case, the VR image can be rotated in a plurality of orientations before input to the neural network unit. Meanwhile, the VR image may be rotated in a plurality of orientations through a separate input unit, and a plurality of the rotated VR images may be input to the neural network.

Furthermore, the evaluator may estimate an evaluation metric of the upright-rectified VR images through a neural network-based evaluator, and may return a VR image having the best evaluation. Meanwhile, the deep learning apparatus and method for the automatic upright rectification of VR content using the evaluator is described more specifically with reference to FIG. 8.

In accordance with embodiments, automatic upright rectification may be performed on VR scene content through a deep learning-based approach designed to automatically process various environments including urban scenes and non-urban scenes, such as countryside, forest and mountain scenes.

Meanwhile, a deep learning apparatus 600 for the automatic upright rectification of VR content according to another embodiment may include a neural network unit 620 configured with a neural network, an input unit inputting a VR image 601 to the deep learning neural network, and an output unit outputting orientation information 602 indicative of the amount of mis-orientation of the VR image 601 through a trained deep learning neural network. Meanwhile, the input unit may rotate the VR image in a plurality of orientations and input a plurality of the rotated VR images to the neural network unit.

The deep learning apparatus may further include a data generation unit 610 automatically generating a dataset of VR images 601 composed of numerous VR images 601 having ground truth orientations in order to train the neural network. Furthermore, the deep learning apparatus may further include a rectification unit 630 performing upright rectification on the VR image 601 by applying the rotation matrix that maps the output orientation information 602 (up-vector) to (0,0,1) to the VR image 601.

Furthermore, the deep learning apparatus may further include an evaluator evaluating a tilted degree of the upright-rectified VR image based on the orientation information (up-vector) output through the neural network and returning a VR image having a small tilted degree. The evaluator is configured based on a neural network, and may estimate an evaluation metric of the upright-rectified VR images and return a VR image having the best evaluation.

The configuration of the deep learning apparatus 600 for the automatic upright rectification of VR content according to another embodiment is the same as or similar to that of the deep learning apparatus 600 for the automatic upright rectification of VR content according to an embodiment, and a redundant description thereof is omitted.

As described above, embodiments are the first deep learning algorithm-based method of automatically upright-rectifying a VR image for general scenes. Furthermore, a problem solved by the approach according to embodiments is very important in the VR market because the approach is an essential technology necessary for the popularization of real-world VR. Such an approach method can overcome the substantial limits or requirements of the existing methods.

Specifically, the approach according to embodiments does not assume that a line is present in an image and does not require additional hardware, and may be applied to general scenes. Such an approach operates in a fully automatic manner and is efficient in computation. A processing time is about 100 ms when a desktop computer equipped with GPU is used.

In accordance with one embodiment, an automatic VR image dataset can be generated by algorithm automatically, and a deep learning neural network can be trained using the generated dataset. Furthermore, the automatic upright rectification of VR content can be performed through the deep learning neural network by estimating orientation information indicative of a tilted degree of a VR image from the input VR image using the trained deep learning neural network. This is described more specifically below through the following embodiments.

Figure 7:
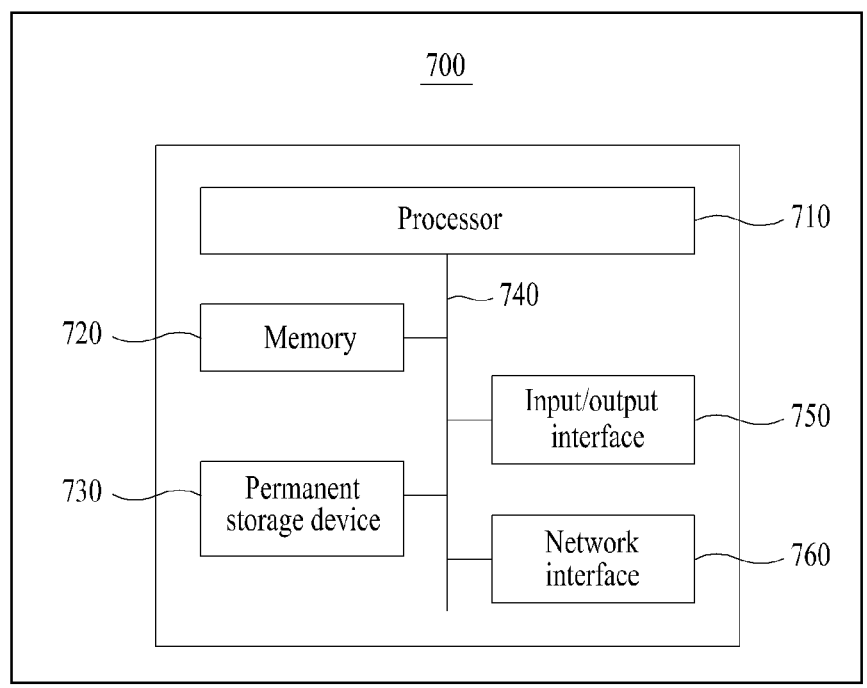
FIG. 7 is a diagram for illustrating the internal configuration of the computer system of the deep learning apparatus for the automatic upright rectification of VR content according to an embodiment.

FIG. 7 is a diagram for illustrating the internal configuration of the computer system of the deep learning apparatus for the automatic upright rectification of VR content according to an embodiment.

Referring to FIG. 7, for example, the deep learning apparatus for the automatic upright rectification of VR content according to an embodiment may be implemented through a computer system 700. The computer system may include a processor 710, memory 720, a permanent storage device 730, a bus 740, an input/output interface 750 and a network interface 760.

The processor 710 may include a given device capable of processing a given sequence of instructions or may be part of the device. The processor 710 may include the deep learning apparatus 600 for the automatic upright rectification of VR content, described in FIG. 6.

The processor 710 may include, for example, a computer processor, a processor and/or digital processor within a mobile device or other electronic device. The processor 710 may be included in a server computing device, a server computer, a series of server computers, a server farm, a cloud computer, a content platform, a mobile computing device, a smartphone, a tablet, a set-top box, and a media player, for example. The processor 710 may be connected to the memory 720 through the bus 740.

The memory 720 may include volatile memory or permanent, virtual or other memory for storing information used or output by the computer system 700. The memory 720 may include random access memory (RAM) and/or dynamic RAM (DRAM), for example. The memory 720 may be used to store given information, such as state information of the computer system 700. The memory 720 may also be used to store the instructions of the computer system 700, including instructions for the automatic upright rectification of a VR image, for example. The computer system 700 may include one or more processors 710, if necessary or in a proper case.

The bus 740 may include a communication-based structure that enables an interaction between various components of the computer system 700. The bus 740 may carry data between the elements of the computer system 700, for example, and between the processor 710 and the memory 720, for example. The bus 740 may include wireless and/or wired communication media between the elements of the computer system 700, and may include parallel, series or other topology arrays.

The permanent storage device 730 may include memory, such as that used by the computer system 700, or an element, such as other permanent storage device, in order to store data for a given extended period (e.g., compared to the memory 720). The permanent storage device 730 may include non-volatile main memory, such as that used by the processor 710 within the computer system 700. The permanent storage device 730 may include, for example, flash memory, a hard disk, an optical disk or other computer-readable media.

The input/output interface 750 may include interfaces for a keyboard, a mouse, a voice command input, display or other input or output device. VR image data information for configuration instructions and/or automatic upright rectification may be received through the input/output interface 750.

The network interface 760 may include one or more interfaces for networks, such as a short distance network or the Internet. The network interface 760 may include interfaces for wired or wireless access. VR image data information for configuration instructions and/or automatic upright rectification may be received through the network interface 760.

Figure 8:
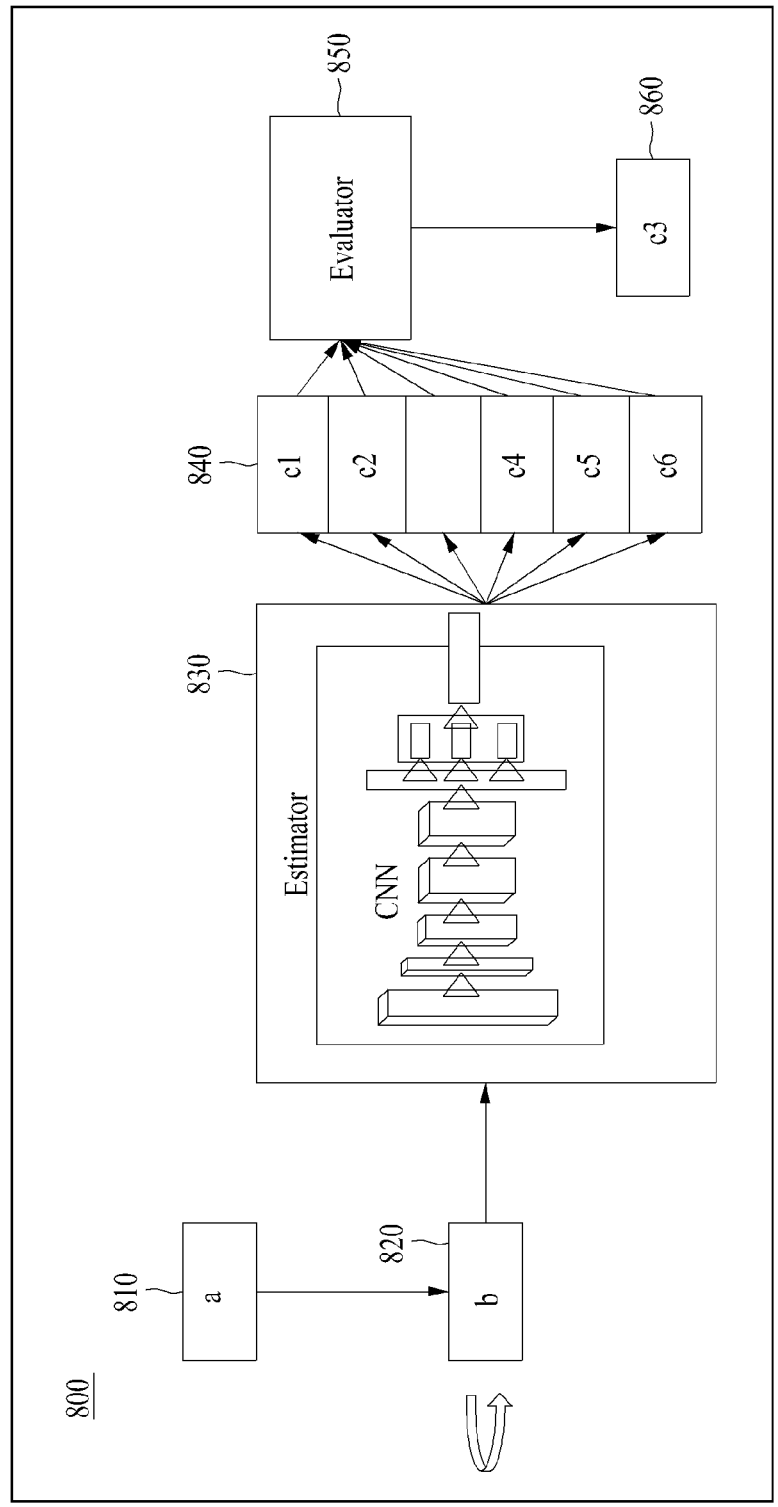
FIG. 8 is a diagram for illustrating a deep learning apparatus for the automatic upright rectification of VR content using an evaluator according to an embodiment.

FIG. 8 is a diagram for illustrating a deep learning apparatus for the automatic upright rectification of VR content using an evaluator according to an embodiment.

Referring to FIG. 8, a deep learning apparatus 800 for the automatic upright rectification of VR content may include a neural network unit 830 and an evaluator 850, and may include a data generation unit and a rectification unit in some embodiments. Furthermore, in some embodiments, the deep learning apparatus 800 for the automatic upright rectification of VR content may further include an input unit and an output unit. The deep learning apparatus 800 for the automatic upright rectification of VR content has been described in detail in FIG. 6, and thus the additionally configured evaluator 850 is chiefly described.

The input unit may rotate a VR image 810(a) in a plurality of orientations, and may input a plurality of the rotated VR images 820(b) to the neural network unit 830.

The input unit may previously rotate the input VR image 810(a) in multiple orientations. For example, orientations and orientation and rotation angles have been previously determined. Meanwhile, the input VR image 810(a) may be randomly rotated. In general, however, as the results of experiments, points uniformly samples in a unit spherical surface have better performance.

The neural network unit 830 may estimate orientation information (up-vector) for all the VR images 820(b) rotated in multiple orientations.

The input to the neural network unit 830 may be the VR image 820(b), and output thereof may be orientation information (up-vector) estimated from the input. In this case, the neural network unit 830 may be a deep learning neural network (e.g., convolution neural network (CNN)).

The rectification unit may rectify the VR image using the estimated orientation information (up-vector). That is, the rectification unit may apply a rotation that maps the output up-vector to the straight direction (0,0,1) to the VR image. In this case, the rectification unit may be included in the neural network unit 830. Upright-rectified multiple VR images 840 may be output through the neural network unit 830 or the rectification unit of the neural network unit 830. For example, the upright-rectified multiple VR images 840 may be expressed as c1, c2, c3, c4, c5 and c6.

The evaluator 850 may evaluate a tilted degree of the upright-rectified VR image 840 based on the orientation information (up-vector) output through the deep learning neural network, and may return a VR image 860 (in this case, c3) having a small tilted degree. More specifically, the evaluator 850 may estimate an evaluation metric of the upright-rectified VR images and return a VR image having the best evaluation.

The evaluator 850 may be configured with a deep learning neural network like the neural network unit 830, and may be configured with a convolution neural network (CNN), for example. Input to the evaluator 850 may be a VR image, and output thereof may be a scalar form, for example. However, a specific format for the output has not been determined and the output may have various forms.

The evaluator 850 may determine how much the input VR image 840 is mis-oriented. For example, if the VR image 840 is severely mis-oriented, the evaluator 850 may output a high value. In contrast, if the input VR image 840 is slightly mis-oriented, the evaluator 850 may output a small value.

If an excellent evaluator 850 is present, a current system can become more robust. The reason for this is that the same VR image 840 may fail when orientation information (up-vector) has a specific value. For example, when the same VR image 840 is present, but orientation information (up-vector) is (30, 127) (phi, theta in the spherical coordination system), the neural network unit 830 may estimate a value of orientation information (up-vector) very similarly. However, when orientation information (up-vector) is (100, 28), the neural network unit 830 may malfunction. This may be overcome using the evaluator 850.

If a VR image has error-prone orientation information (up-vector), the VR image may be rotated to a specific value. The angle may be multiple. If multiple rotated VR images are present, they may be evaluated by the evaluator 850, and the best of the VR images may be selected.

A method training the evaluator 850 may be similar to the method of training the neural network unit 830. In this case, a difference is that a VR image and its corresponding orientation information (up-vector) are provided to the neural network unit 830 as ground truths, whereas metric according to the orientation of a VR image must be provided to the evaluator 850. For example, available metrics include Geodesic Distance, Manhattan Distance, Frobenius Norm, etc. In addition, other types of metrics may be used. The core of the metric is that a value may be changed while operating in conjunction with the orientation of an image.

The above-described apparatus may be implemented as a hardware component, a software component and/or a combination of them. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure the processing apparatus to operate as desired or may instruct the processing apparatus independently or collectively. Software and/or data may be embodied in any type of a machine, component, physical device, virtual equipment or computer storage medium or device in order to be interpreted by the processing apparatus or to provide an instruction or data to the processing apparatus. Software may be distributed to computer systems connected over a network and may be stored or executed in a distributed manner. Software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may have been common to those skilled in the computer software. The computer-readable recording medium includes a hardware device specially configured to store and execute the program instruction, for example, magnetic media such as a hard disk, a floppy disk and a magnetic tape, optical media such as CD-ROM and a DVD, magneto-optical media such as a floptical disk, ROM, RAM, and flash memory. Examples of the program instruction may include high-level language code executable by a computer using an interpreter in addition to machine-language code, such as code written by a compiler.

In accordance with the embodiments, there can be provided the deep learning method and apparatus for the automatic upright rectification of VR content, which estimate orientation information indicative of a tilted degree of a VR image from an input VR image using the deep learning neural network.

In accordance with the embodiments, automatic upright rectification can be performed on VR scene content through the deep learning-based approach method designed to automatically process various environments including urban scenes and non-urban scenes, such as countryside, forest and mountain scenes.

As described above, although the embodiments have been described in connection with the limited embodiments and drawings, those skilled in the art may modify and change the embodiments in various ways from the description. For example, proper results may be achieved although the above-described descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments, and equivalents of the claims belong to the scope of the claims.

What is claimed is:

1. A deep learning method for automatic upright rectification of VR (Virtual Reality) content, comprising:
   inputting a VR image to a neural network;
   automatically generating a dataset of VR images composed of numerous VR images having ground truth orientations in order to train the neural network; and
   outputting orientation information (up-vector) of the input VR image through a trained neural network,
   wherein automatically generating the dataset of VR images comprises:
   automatically downloading numerous VR images from the Internet;
   assuming these VR images to be an upright state;
   generating new VR images by synthetically rotating these VR images to obtain various orientations; and
   training the neural network using the generated dataset of VR images,
   the method further comprising:
   upright-rectifying the VR image by applying a rotation that maps the output up-vector to the straight direction (0,0,1) to the VR image, and
   evaluating an amount of mis-orientation of the upright-rectified VR image based on the orientation information (up-vector) output through the deep learning neural network,
   wherein inputting the VR image, to the neural network comprises rotating the VR image in a plurality of orientations and inputting this plurality of rotated VR images to the deep learning neural network, and
   wherein the evaluating the amount of mis-orientation of the upright-rectified VR image comprises estimating an evaluation metric of the upright-rectified VR images through a deep learning neural network-based evaluator and then returning a VR image having a small tilted degree.

2. The deep learning method of claim 1, wherein inputting the VR image to the deep learning neural network comprises inputting the VR image to a convolutional neural network (CNN).

3. The deep learning method of claim 1, wherein the orientation information has been parameterized as at least one of a unit vector, rotation angles, azimuth+elevation angles, and quaternion,
   wherein these parametrizations define an up-vector, corresponding to the orientation of the input image.

* * * * *